United States Patent [19]

Eto et al.

[11] Patent Number: 4,666,548

[45] Date of Patent: May 19, 1987

[54] PROCESS FOR MAKING FLUORESCENT DISPLAY DEVICE

[75] Inventors: Goro Eto; Shigeo Itoh; Mikio Yokoyama; Takeshi Tonegawa, all of Mobara, Japan

[73] Assignee: Futaba Denshi Kogyo Kabushiki Kaisha, Mobara, Japan

[21] Appl. No.: 714,392

[22] Filed: Mar. 12, 1985

[30] Foreign Application Priority Data

Mar. 28, 1984 [JP] Japan .................................. 59-58496

[51] Int. Cl.[4] ............................................... B32B 31/26

[52] U.S. Cl. ........................................ 156/286; 65/43; 156/89; 220/2.1 R; 313/477 R; 445/43

[58] Field of Search ....................... 65/43; 156/89, 285, 156/286; 220/2.1 A, 2.1 R, 2.2; 313/467,477 R; 445/43, 44

[56] References Cited

U.S. PATENT DOCUMENTS 3,166,396 1/1965 Miller et al. ...................... 445/43 X 3,826,634 7/1974 Blust et al. ......................... 65/43 X

*Primary Examiner*—Robert A. Dawson

*Attorney, Agent, or Firm*—Oblon, Fisher, Spivak, McClelland & Maier

[57] ABSTRACT

A process for making a fluorescent display device capable of accomplishing the mass production of a tipless fluorescent display device with good reliability and productivity is disclosed. The process is adapted to carry out, in a single chamber, a step of hermetically bonding an anode substrate and a casing together to form a hermetic envelope and a step of sealing the envelope in vacua.

6 Claims, 8 Drawing Figures

CONTINNED ON FIG. 5B

PROCESS FOR MAKING FLUORESCENT DISPLAY DEVICE

BACKGROUND OF THE INVENTION

1. Field of the Invention

This invention relates to a process for making a fluorescent display device which is adapted to be used for an electronic apparatus, a vehicle, a game and the like, and more particularly to a process for making a tipless fluorescent display device which does not require a tip tube for evacuating an envelope of the device.

2. Description of the Prior Art

A fluorescent display device is generally constructed in a manner such that an envelope in which electrodes such as an anode, a control electrode, a cathode and the like are arranged has an evacuation tube of glass called a tip tube inserted at one end thereof through an evacuation hole of the envelope therein and outward projected at the other end thereof from the hole in order to facilitate the formation of the envelope of a high vacuum. The envelope is evacuated through the tip tube to a high vacuum and then the tip tube is sealed by melting to keep the envelope at a high vacuum.

However, such construction of the envelope has such a disadvantage that not only the projection of the tip tube from the envelope after the sealing of the tip tube deteriorates a space factor of a fluorescent display device in the incorporation of the fluorescent display device in a desired display system but also the tip tube is decreased in impact resistance because of being formed of glass. Thus, it was desired to develop a fluorescent display device without such a tip tube which is called a tipless fluorescent display device in the art.

Such a typical tipless fluorescent display device has been proposed in Japanese utility Model Publication No. 10291/1983 which includes an envelope in such a manner as shown in FIG. 1. More particularly, the conventional envelope, as shown in FIG. 1, comprises a glass substrate A and a casing H wherein the glass substrate A is formed with a through-hole B and has a ceramic member D fixedly mounted on the inner surface at the periphery of the through-hole B by means of frit glass C. The ceramic member D is also formed with a through-hole E of a smaller diameter so as to be substantially concentrical with the through-hole B of the glass substrate A, and the inner surface of the ceramic member D defining the through-hole E and the portion of the ceramic member D exposed to the through-hole B of the glass substrate A are applied thereto a metallizing layer F. Subsequently, the glass substrate A and casing H are hermetically secured together to form an envelope and then solder G is applied to the periphery of the through-hole E. Thereafter, the envelope is evacuated and finally the periphery of the through-hole E is heated to melt the solder G, to thereby hermetically seal the envelope.

Unfortunately, the conventional envelope assembled as described above has such a defect that the envelope is highly difficult in manufacturing and complicated in structure, because the ceramic member D hard to be worked must be formed with the through-hole E and it is required to securely fix the ceramic member D at the periphery of the through-hole B of the glass substrate A from the inside of the envelope in a specific atmosphere.

The envelope also has another disadvantage that the melting of the solder G to charge the through-hole E of the ceramic member D with the solder G causes the solder G to be in a liquid state to promote the generation of metal vapor from the surface thereof and gas due to the decomposition of organic flux used. This results in the vapor and gas remaining in the envelope and being adsorbed on an oxide cathode to cause the surface contamination of the cathode and/or the sintering of the contaminant into the cathode, to thereby deteriorate the electron emitting capacity of the cathode. Also, this causes the loss of vacuum in the envelope and the surface contamination of phosphor. Thus, the display characteristics of a fluorescent display device to be obtained is substantially decreased.

A further problem encountered with the conventional envelope is that, because a step of heating the substrate A and the casing H to hermetically bonding the both together and a step of subjecting the periphery of the through-hole E of the ceramic member D to a heating treatment to seal the through-hole while evacuating the envelope are required to be carried out at different places, respectively, adsorptive gas such as $H_2O$, $CO_2$, CO and the like enters the envelope through the evacuation hole during the movement from the former step to the latter one to cause the loss of high vacuum in the envelope. Furthermore, a baking treatment for completely removing the adsorptive gas from the envelope is highly difficult.

SUMMARY OF THE INVENTION

The present invention has been made in view of the foregoing disadvantages of the prior art.

Accordingly, it is an object of the present invention to provide a process for making a fluorescent display device which is capable of accomplishing the mass production of a fluorescent display device with good reliability and productivity and without being adversely affected by any external environmental factor.

It is another object of the present invention to provide a process for making a fluoresent display device which is capable of making a fluorescent display device improved in space factor and adapted to be readily incorporated in a desired display system.

It is a further object of the present invention to provide a process for making a fluorescent display device which does not require any separate baking step.

It is still a further object of the present invention to provide a process for making a fluorescent display device which is capable of providing a fluorescent display device significantly improved in luminance and pulse emission characteristics and with substantially increased life.

In accordance with the present invention, there is provided a process for making a fluorescent display device which includes electrodes such as a phosphor-coated anode, a cathode and the like and a hermetic envelope having an anode substrate, a casing and an evacuation hole arranged to received the electrodes therein comprising the steps of applying oxide solder to at least one of the sealed portions of the anode substrate and casing; subjecting the oxide solder to a pre-baking treatment; arranging the electrodes and casing on the anode substrate to form an assembly and heating the assembly in a chamber of a vacuum atmosphere or inert gas atmosphere hermetically secure the anode substrate and casing, to thereby form the envelope; and forming atmosphere in the chamber to carry out the evacuation of the envelope to a high vacuum through the evacuatiom hole and then sealing the evacuation hole.

BRIEF DESCRIPTION OF THE DRAWINGS

Other objects and many of the attendant advantages of the present invention will be readily appreciated as the same becomes better understood by reference to the following description when considered in connection with the accompanying drawings; wherein.

DETAILED DESCRIPTION OF THE PREFERRED EMBODIMENT

Now, a process for making a tipless fluorescent display device according to the present invention will be described with reference to FIGS. 2 to 7.

Figure 1:
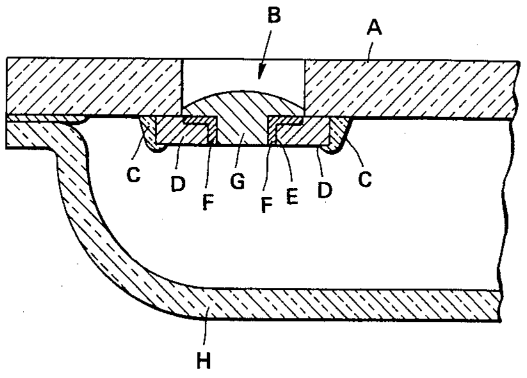
FIG.1 (PRIOR ART)
FIG. 1 is a vertical sectional view showing the essential part of an envelope for a conventionally proposed tipless fluorescent display device.

In the illustrated embodiment, first of all, an anode substrate 1 made of a transparent insulating plate, for example, such as a glass plate is formed with an evacuation hole 18. Then, an oxide solder layer 5 is depositedly formed on the periphery of the anode substrate 1 and subjected to a pre-baking treatment in the atmosphere or an oxidizing atmosphere at 200°–400° C. to cause a gas component contained in the oxide solder to be released therefrom. Thereafter, wiring conductors 2 are arranged on the anode substrate 1 by printing depending upon a desired display pattern and baked, and then insulating layers 3 are deposited on the substrate 1 by printing in such a manner as shown in FIG. 1 and baked. Further, anode conductors 4 are formed by printing so as to be electrically conductive with the wiring conductors 2 depending upon the display pattern and subjected to baking. Finally, a phosphor layer 6 is deposited on each of the anode conductors 4 by printing and baked, to thereby complete an anode.

Subsequently, to the peripheral edge of an upper plate 7 made of glass is applied a sealing material 8 of glass, and four side wall plates 9 each are positioned at one end thereof on the peripheral edge of the upper plate 7 through the sealing material 8 so as to downward extend therefrom and the sealing material 8 is subjected to baking. Then, oxide solder 10 is applied to the other end surface 9*a* of each of the side wall plates 9 opposite to the anode substrate 1 and subjected to pre-baking in the atmosphere or an oxidizing atmosphere at 200°–400° C. to form a casing 11.

The oxide solder layers 5 and 10 each may be formed of solder of a low melting point essentially consisting of lead oxide (PbO). In the embodiment illustrated, each of the solder layers 5 and 10 is formed of a glass sealing material of a low melting point mainly consisting of amorphous or crystalline frit glass.

In the illustrated embodiment, the oxide solder is applied to both the anode substrate 1 and the sealing surface 9*a* of the casing 11. However, it may be applied to only one of the substrate 1 and the casing 11.

Then, mesh-like control electrode 13 and a plurality of filimentary cathodes 14 are stretchedly mounted over the anode through spacer frames 12.

Figure 4:
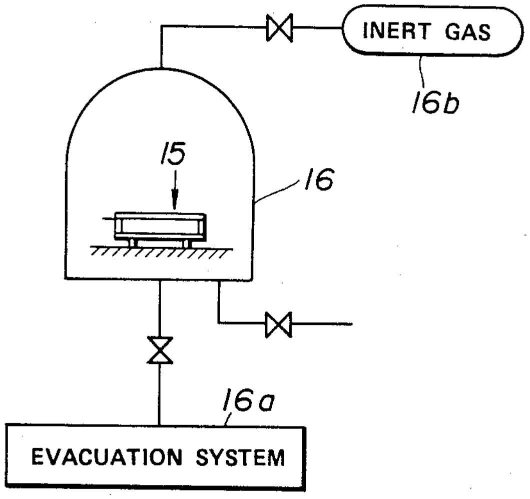
FIG. 4 is a block diagram showing a system adapted to be used for hermetic bonding and sealing steps in a process according to the present invention.
Figure 5A:
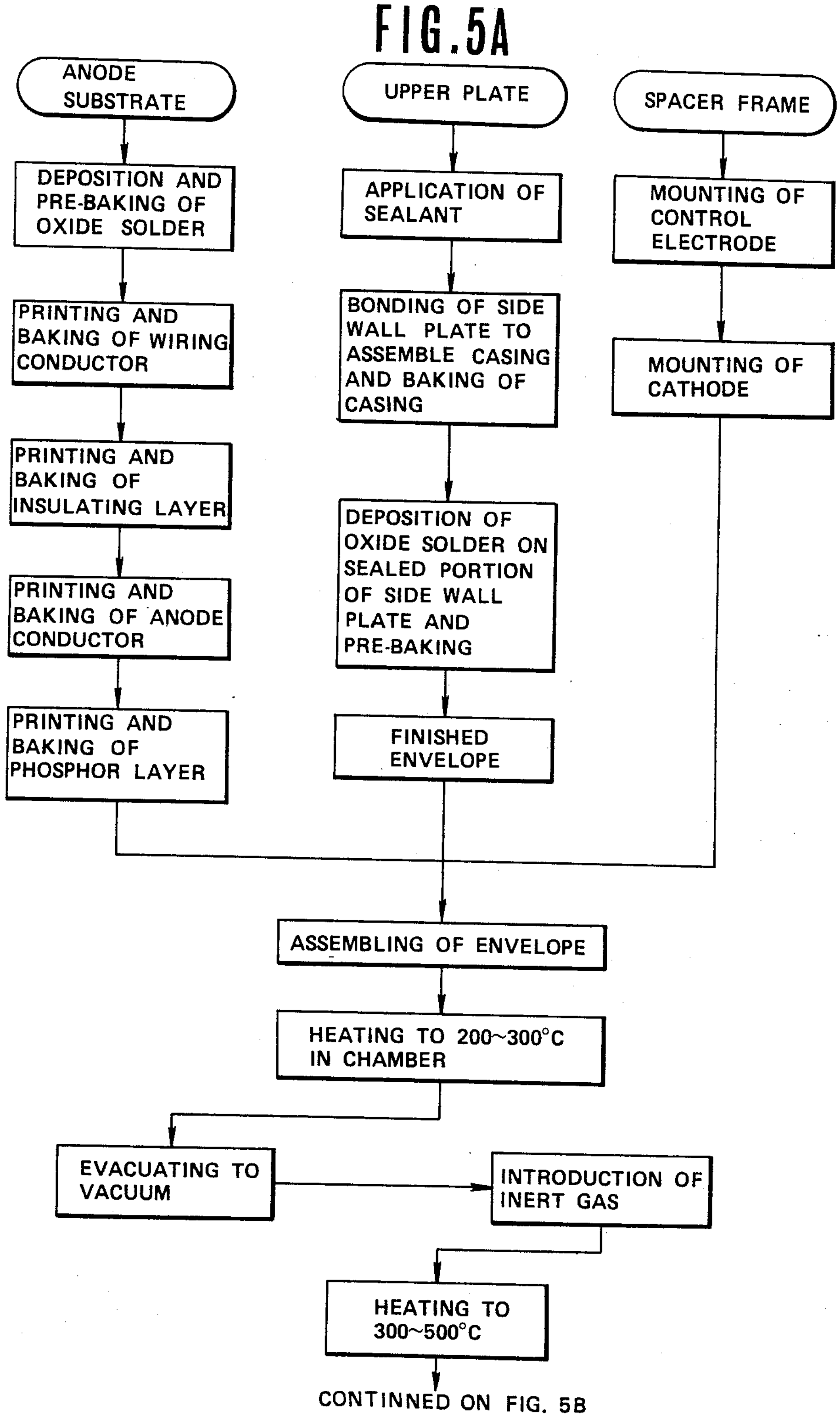
FIGS. 5(*a*) and 5(*b*) are flow sheets detailedly illustrating procedures of a process according to the present invention, respectively.
Figure 5B:
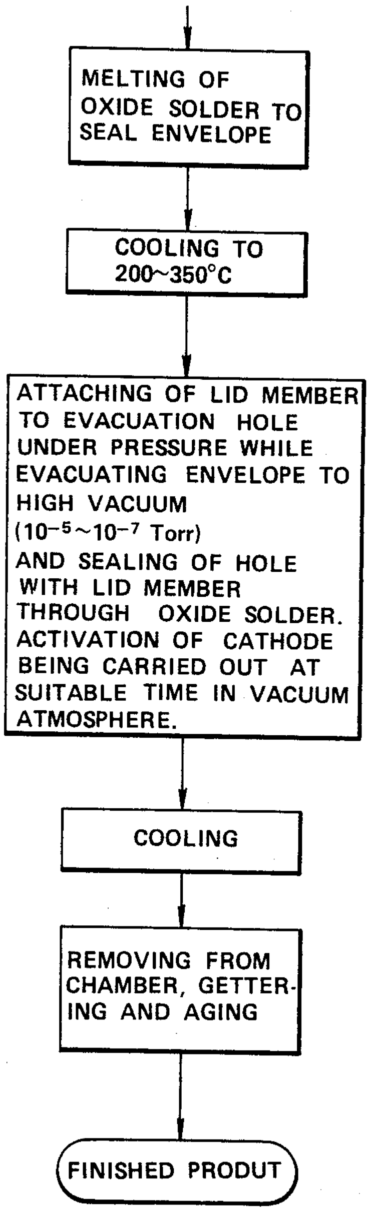

Subsequently, the casing 11 is positioned on the anode substrate 1 in a manner to receive the control electrode 13 and cathodes 14 therein, and the oxide solder layers 5 and 10 are superposed together to assemble an envelope 15, which is then received in a chamber 16 as shown in FIG. 4. The chamber 16 is heated to a temperature of 200°–300° C. and then kept therein at a high vacuum atmosphere utilizig a vacuum system 16*a* or an inert or neutral gas atmosphere by supplying inert gas such as Ar or the like or neutral gas such as $N_2$, $CO_2$ or the like thereto from an inert or neutral gas source 16*b*. Thereafter, the chamber 16 is heated to 300°–600° C. to cause the oxide solder layers 5 and 10 to be melted under pressure to hermetically bond the anode substrate and casing 11 together, resulting in the hermetic envelope 15 being completed. Then, the envelope is cooled to 200°–400° C.

Figure 2:
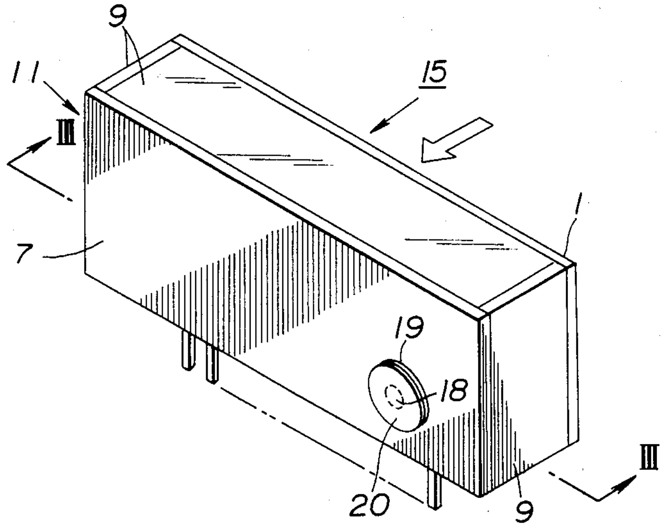
FIG. 2 is a perspective rear view showing a tipless fluorescent display device obtained according to a process of the present invention.
Figure 3:
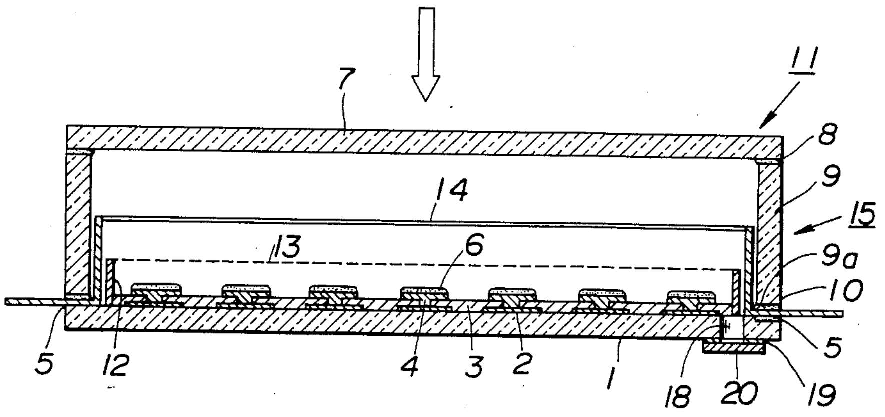
FIG. 3 is a vertical sectional view taken along line III—III of FIG. 2.

In the illustrated embodiment, the anode substrate 1 constituting a part of the envelope 15 is previously formed at a predetermined position thereof with an evacuation hole 18 as shown in FIGS. 2 and 3. Also, an oxide solder layer 19 of the same material as the oxide solder layers 5 and 10 is depositedly formed on the periphery of the hole 18, and a lid member 20 of, for example, a disc-like shape is positioned through the solder layer 19 on the portion of the anode substrate 1 in close proximity to the evacuation hole 20 where it does not resist the evacuation of the envelope 15 through the evacuation hole 18. The lid member 20 may be made of a suitable plate material such as a glass plate, ceramic plate, a metal plate or the like. When it is made of a metal plate, 426 alloy essentially consisting of 42% Ni, 6% Cr and 52% Fe is preferably used.

Thereafter, the envelope 15 is re-heated and then the chamber 16 is evacuated to a high vacuum by means of the vacuum system 16*a* to evacuate the envelope 15 and keep the envelope at a high vacuum of $10^{-5}$–$10^{-7}$ Torr and concurrently the lid member 20 is locally heated to a temperature of 300°–600° C. while applying pressure thereto to melt the oxide solder layer 19 to hermetically seal the evacuation hole 18 with the lid member 20. Finally, the lid member 20 is cooled and then a fluorescent display device having the envelope 15 sealedly kept at a high vacuum is taken out from the chamber 16, and a completed fluorescent display device is then obtained through gettering and ageing treatments.

It is a matter of course that the activation of the cathodes is carried out in a vacuum atmosphere.

As described above, the process of the illustrated embodiment is adapted to carry out both the step of forming the hermetic envelope and the step of sealing the envelope in vacua in the single chamber, to thereby eliminate the positional movement of the envelope from the former step to the latter one through a different atmosphere. Thus, any foreign substance is effectively prevented from entering the envelope which causes the contamination of the envelope. Also, in the illustrated embodiment, the oxide solder layer 19 for adhering the lid member 20 to the envelope 15 to seal the evacuation hole 18 is applied to the outer surface of the anode substrate 1 and adapted to be melted while the envelope 15 is evacuated to a high vacuum so that the lid member 20 may be hermetically bonded to the envelope through the melted oxide solder 19 to effectively seal the evacuation hole 18. Accordingly, gas generated due to the decomposition of the oxide solder during the melting is positively prevented from entering the envelope 15. Thus, the process of the illustrated embodiment effectively eliminates disadvantages such as the deterioration of pulse emission characteristics of the cathode 14, the loss of vacuum in the envelope 15, the surface contamination of the phosphor layer 6 and the like.

A fluorescent display device obtained according to the illustrated embodiment, as shown in FIG. 3, is the type that luminous display of the phosphor layer 6 is observed through the upper cover 7. Thus, it is required to form the front cover 7 of a transparent material. However, a fluorescent display device prepared according to the present invention is not limited to such a type and includes that of the front-emission type that the luminous display is observed through the anode substrate 1. In this instance, at least the anode substrate 1 is made of a transparent material such as transparent glass.

Further, in the illustrated embodiment, the evacuation hole 18 is formed at the anode substrate 1. However, it may be provided at the upper plate 7 or any one of the side wall plate 9 and sealed with the lid member 20.

Furthermore, when the present invention is to be applied to the preparation of, for example, a high luminance fluorescent display device, it may be constructed in a manner to form a part of the envelope 15 of a metal meterial substituted for a glass material and provide the metal portion of the envelope with the evacuation hole 18. Even in this instance, it is possible to seal the evacuation hole 18 with the lid member 20 through the oxide solder layer 19.

The above description has been made in connection with the preparation of a tipless fluorescent display device. However, the present invention is of course applicable to the preparation of a fluorescent display device of the type having a tip tube.

Now, the luminance life and pulse emission life characteristics of a fluorescent display device prepared as described above according to the present invention (hereinafter referred to as "present fluorescent display device") will be described in comparison with those of a fluorescent display device obtained by the prior art process (hereinafter referred to as "conventional fluorescent device") with reference to FIGS. 6 and 7.

Figure 6:
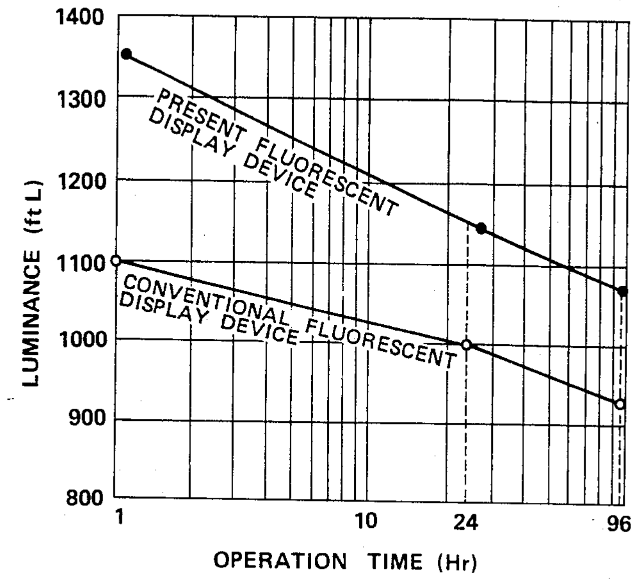
FIGS. 6 and 7 are graphical representations showing the results of tests for comparisons in luminance life and pulse emission life between a fluorescent display device prepared according to the present invention and that prepared according to a conventional one, respectively.

FIG. 6 shows the variation of luminance L to operation time Hr in each of the present fluorescent display device and the conventional one. As is apparent from FIG. 6, the present fluorescent display device is highly increased in initial luminance and exhibits luminance kept at a significantly high level even after the lapse of 96 hours, as compared with the conventional one.

Figure 7:
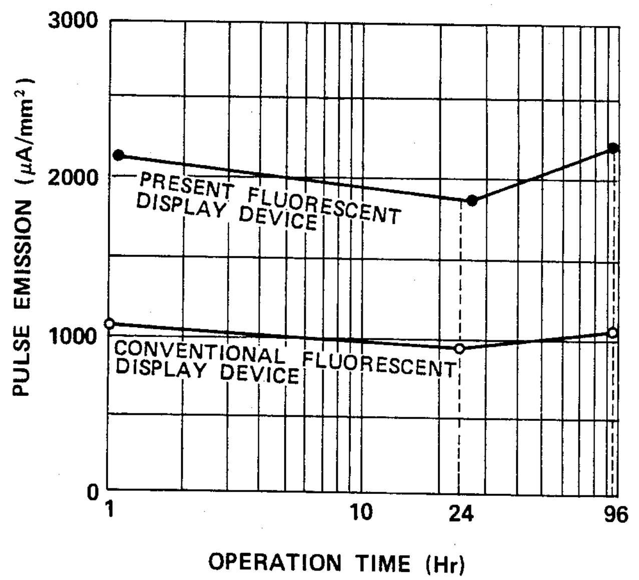

FIG. 7 shows the variation of pulse emission Is to operation time Hr in each of the present fluorescent display device and the conventional one. It will be readily appreciated that the present fluorescent display device is excellent in pulse emission characteristics twice as much as the conventional one.

The characteristics shown in FIGS. 6 and 7 were obtained under the conditions that cathode voltage Ef and D.C. electrode voltage Eb Ec were set at 2.4 Vac and 20 Vdc, respectively.

As described above, the process according to the present invention is constructed to apply oxide solder to at least one of the sealed portions of the anode substrate and casing, subject the oxide solder to pre-baking, arrange the electrodes and casing on the anode substrate to form an assembly, heat the assembly in the chamber of an vacuum or inert gas atmosphere to hermetically bond the anode substrate and casing together to form the envelope, evacuate the chamber to a high vacuum and subject the envelope to evacuation through the evacuation hole in the chamber kept at a high vacuum, and then seal the evacuation hole with the lid member through the oxide solder.

Thus, the present invention facilitates the manufacturing of a fluorescent display device simplified in structure without a tip tube for evacuation of which the sealing requires a great deal of skill. More particularly, in the present invention, both the step of hermetically bonding the anode substrate and casing together to form the hermetic envelope and the step of sealing the evacuation hole of the evacuated envelope with the lid member to keep the envelope at a high vacuum are carried out in the single chamber. This allows the automation of the process to be readily accomplished and significantly shortens time required for evacuating the envelope to a high vacuum. Also, this effectively prevents a fluorescent display device to be manufactured being adversely affected by any external environmental factor. Thus, it will be noted that the present invention is capable of carrying out the mass production of a tipless fluorescent display device with good reliability and productivity.

Also, the present invention is capable of providing a tipless fluorescent display device without a tip tube forming obstruction to the charging of a fluorescent display device in a display system. Thus, a fluorescent display device obtained according to the present invention is significantly improved in space factor and readily incorporated in a display system.

Further, the present invention concurrently accomplishes the heating of the envelope in the chamber during the formation of the hermetic envelope and the sealing of the envelope in vacua, resulting in the baking of the oxide solder being concurrently carried out during the steps. Thus, the present invention does not require the baking separate from the steps so that energy saving may be effectively accomplished.

Furthermore, the present invention prevents contaminant such as gas which causes the surface contamination of the electrodes and phosphor from entering the envelope, thus, a fluorescent display device obtained according to the present invention may be significantly improved in luminance and pulse emission characteristics and substantially increased in life, as compared with that prepared according to the conventional process.

While a preferred embodiment of the present invention has been described with a certain degree of particularity, obvious modifications and variations are possible in light of the above teachings. It is therefore to be understood that within the scope of the appenced claims, the invention may be practiced otherwise than as specifically described.

What is claimed as new and desired to be secured by Letters Patent of the United States is:

1. A process for making a fluorescent display device which includes electrodes such as a phosphor-coated anode a cathode and the like and a hermetic envelope having an anode substrate, a casing and an evacuation hole arranged for receiving said electrodes therein, comprising the steps of:

applying oxide solder to an outside surface of at least one of the sealed portions of said anode substrate and said casing;

subjecting said oxide solder to a pre-baking treatment;

assembling said electrodes and said casing on said anode substrate to form an envelope and heating said envelope in a chamber of a vacuum atmosphere or inert gas atmosphere to hermetically bond said anode substrate and said casing together; and forming a vacuum atmosphere in said chamber to evacuate said envelope through said evacuation hole to a high vacuum and then sealing said evacuation hole with a lid member.

2. A process as defined in claim 1, wherein at least one of said anode substrate and casing is formed of a transparent material.

3. A process is defined in claim 2, wherein said transparent material is glass.

4. A process as defined in claim 1, wherein said oxide solder essentially consists of frit glass, said frit glass being amorphous or crystalline glass.

5. A process as defined in claim 1, wherein said oxide solder is pre-baked in the atmosphere or an oxidizing atmosphere.

6. A process as defined in claim 1, wherein said evacuation hole is sealed with a lid member formed of a glass or metal plate by means of a sealing material of glass.

* * * * *

UNITED STATES PATENT AND TRADEMARK OFFICE

CERTIFICATE OF CORRECTION

PATENT NO. : 4,666,548

DATED : May 19, 1987

INVENTOR(S) : Goro Eto, et al

It is certified that error appears in the above-identified patent and that said Letters Patent is hereby corrected as shown below:

Filing date is incorrect.
Should read as follows:

= March 21, 1985 =

Signed and Sealed this

Twenty-second Day of September, 1987

*Attest:*

DONALD J. QUIGG

*Attesting Officer* *Commissioner of Patents and Trademarks*